United States Patent [19]

Goodman et al.

[11] Patent Number: 4,501,682
[45] Date of Patent: * Feb. 26, 1985

[54] CLEANING AND PROTECTIVE COMPOSITION AND METHOD

[75] Inventors: Edward Goodman, 265 E. 66th St. - Apt. 11C, New York, N.Y. 10021; James P. Dux; Fred R. Albright, both of Lancaster, Pa.

[73] Assignee: Edward Goodman, New York, N.Y.

[ * ] Notice: The portion of the term of this patent subsequent to Dec. 22, 1998 has been disclaimed.

[21] Appl. No.: 450,650

[22] Filed: Dec. 17, 1982

[51] Int. Cl.$^3$ .................... C08L 83/04; C09D 9/00; C11D 7/30

[52] U.S. Cl. ................... 252/174.15; 106/2; 252/139; 252/162; 252/171; 252/172; 252/DIG. 8; 427/387; 427/393.4

[58] Field of Search .......... 252/162, 171, 172, 174.15, 252/DIG. 8, 139; 427/387, 393.4; 106/2

[56] References Cited

U.S. PATENT DOCUMENTS

| | | | |
|---|---|---|---|
| 2,985,544 | 5/1961 | de Monterey | 528/18 |
| 3,009,833 | 11/1961 | Somerville | 427/387 |
| 3,628,996 | 12/1971 | Weber | 427/387 |
| 3,637,427 | 1/1972 | Tsuruta et al. | 427/387 |
| 3,915,902 | 10/1975 | Ancel et al. | 252/DIG. 8 X |
| 4,151,344 | 4/1979 | Doss et al. | 528/18 |
| 4,306,990 | 12/1981 | Goodman et al. | 252/174.15 |
| 4,382,960 | 5/1983 | Flom | 424/358 |

OTHER PUBLICATIONS

The Merck Index, Merck & Co., Inc., 1976, p. 1139.

*Primary Examiner*—John E. Kittle
*Assistant Examiner*—Mukund J. Shah
*Attorney, Agent, or Firm*—Lackenbach, Siegel, Marzullo, Presta & Aronson

[57] ABSTRACT

An improved cleaning and protecting solution comprising an admixture of poly(methylhydrosiloxane) and zinc and tin octoates in 1, 1, 1-trichloroethane, wherein the improvement consists of replacing all or part of the trichloroethane by at least one solvent selected from the group consisting of cyclic poly(dimethylsiloxane)s, poly(dimethylsiloxane) oils, petroleum distillates and methylene chloride and the admixture of zinc and tin octoates by at least one catalyst selected from the group consisting of dibutyl tin oxide and dialkyl tin dicarboxylates.

13 Claims, No Drawings

CLEANING AND PROTECTIVE COMPOSITION AND METHOD

BACKGROUND OF THE INVENTION

This invention relates to an improved composition for cleaning and protecting various textile fibers and fabrics, and hard surfaces and coatings. The invention also includes a method for using the improved composition for its intended purpose in one application.

A variety of products are known which relate to various compositions for treating fibrous materials for a number of purposes, including cleaning, and/or applying a protective coating to make them water repellent and/or stain resistant.

U.S. Pat. No. 3,009,833 to Somerville discloses a composition for treating fibrous materials to make them water repellent. The composition includes a methyl-polysiloxane fluid, an orgamotin oxide, and a metal octoate. The treatment medium can be in the form of an aqueous emulsion, or a solution in an organic solvent such as toluene, acetone, white spirits, isopropanol, and the like. Once the fabric or paper has been contacted with the siloxane composition, the temperature is raised to a temperature not greater than 150° C. to cure the polysiloxane. The coating obtained is supposed to be durable to laundering, solvent rinsing, and the like.

U.S. Pat. No. 2,807,601 to Dennet relates to an orgamo-silicon composition useful in treating organic fabrics with hydroxylated siloxane compositions to provide water repellency to fabrics along with resistance to grease spotting and solvent spotting, and shrinking of wool during laundering. The organo-silicon compositions are applied to fabrics in amounts such that the "pick up" ranges from 0.1 to 5 percent, and can be applied in any desired manner such as by dipping or spraying, or in the form of solutions or emulsions. After application of the organo-silicon compositions, the fabric is heated to remove any solvent or water and to cure the siloxane. The heating temperatures vary from 100°–475° F. for periods of from 5 seconds to one hour. Curing catalysts such as zinc or iron octoate, lead-2-ethylhexoate, and the like, can be employed to aid in the curing of the siloxane. The siloxane composition can be employed in suitable solvent media such as benzene, toluene, and petroleum hydrocarbons.

U.S. Pat. No. 3,423,236 to Quaal discloses the use of siloxane copolymers to impart water repellency to various substrates such as fabrics, paper, glass, leather, wood and masonry. The siloxane copolymer is generally applied in a solvent solution using such organic solvents as toluene, perchloroethylene, hexane, acetone, isopropanol, ethanol, and methanol. The siloxane copolymer can also be applied to fabrics from aqueous emulsions or by means of aerosol application. In instances where the siloxane copolymers are applied to fabrics, curing is accomplished with a catalyst at temperatures of 30°–260° C. and the fabric's water repellency is supposed to last through several washings. Suitable catalysts include metal carboxylates, such as zinc ocoate.

U.S. Pat. No. 2,927,870 to Beutler discloses the treatment of fabrics of synthetic and natural fiber origin with organosiloxane emulsions containing catalysts, to provide water repellency. The composition uses a combination of zirconium acetate and zinc acetate as catalysts in organo-siloxane emulsion.

U.S. Pat. No. 3,418,162 to Adachi discloses a composition and process for manufacturing waterproof cloth with a composition that includes organo-polysiloxanes, aminoalkyloxysilanes, an organotin compound, and an organic catalyst. The treated waterproof cloth is supposed to have a coating of silicone resin which is not attached by organic solvents such as trichloroethylene.

U.S. Pat. No. 3,336,158 to Wada et al discloses a method for making various articles, including fabrics, water-repellent by applying a metallic compound in admixture with a catalyst such as zinc acetate or zinc formate in combination with a polysiloxane. The treated articles are allowed to dry for a day or two at room temperature, presumably to effect a cure.

U.S. Pat. No. 3,058,850 to Sell discloses a method for making textile fabrics water repellent by treating with a polymerizable silicone material and a zirconium salt of an organic acid. The composition can be applied in the form of an emulsion with the assistance of various organic solvents.

U.S. Pat. No. 3,445,418 to Gibbon et al discloses organo-silicon compositions for depositing films on paper and other materials. The composition includes a linear organo-polysiloxane, a tin salt of a carboxylic acid, an organic solvent, and water.

U.S. Pat. No. 3,436,252 to Neuroth discloses a release composition for paper comprising a linear organo-polysiloxane, a metal salt of a carboxylic acid, and various organic solvents.

U.S. Pat. No. 2,985,544 to de Monterey et al discloses a method for making paper and paper products non-adherent to normally adherent materials, such as tars, waxes, pastes, and the like, by means of treating the paper products with a polysiloxane composition containing a polyvinyl alcohol emulsifying agent and dibutyl tin laurate.

U.S. Pat. No. 3,730,762 to Deiner et al discloses a method for improving the slipping resistance and delustering of textiles.

U.S. Pat. No. 3,637,427 to Tsuruta et al discloses a process for waterproofing fabrics with organo-polysiloxanes.

U.S. Pat. No. 4,306,990 to Goodman, et al discloses a composition and method for cleaning and protecting various substrates with said composition wherein said composition comprises a solution of an admixture of poly(methylhydrosiloxane), zinc octoate and tin octoate in a solvent consisting of 1, 1, 1-trichloroethane.

However, said composition suffers in that the solvent 1, 1, 1-trichloroethane is considered to have some toxicological and dermatitic properties, has a relatively unpleasant odor, causes smearing on some substrate surfaces and dissolves, or at least attacks, other substrates such as poly(vinyl chloride), e.g. in phonograph discs, paints and acrylics.

It has now been found, in accordance with this invention, that the above substrates may be cleaned and protected, without the concomitant disadvantages indicated above for the prior art compositions, by using the improved cleaning and protecting composition of the instant invention.

SUMMARY OF THE INVENTION

In accordance with the invention, there is provided an improved composition comprising a solution of the admixture of poly(methylhydrosiloxane), tin octoate and zinc octoate in a solvent partly or completely free of 1,1,1-trichloroethane useful to clean and protect surfaces, including fabric floor coverings, wall coverings, textiles, glass, leather and tile, painted surfaces comprising plastic substrates, such as poly(vinyl chloride) and acrylic resin.

DESCRIPTION OF THE PREFERRED EMBODIMENTS

The instant invention provides an improved composition for cleaning and protecting surfaces, comprising the solution of an admixture of poly(methylhydrosiloxane), tin octoate and zinc octoate in a solvent partly or completely free of 1,1,1-trichloroethane.

Thus, in accordance with the invention, there is provided an improved cleaning and protecting composition comprising a solution of an admixture of poly(methylhydrosiloxane), tin octoate and zinc octoate in 1,1,1-trichloroethane wherein the improvement comprises replacing part or all of the trichloroethane by at least one solvent selected from the group consisting of cyclic poly(dimethylsiloxane)s, poly(dimethylsiloxane) oils, petroleum distillates and methylene chloride.

The cyclic poly(dimethylsiloxane)s useful in accordance with the invention are known in the art and include the tetramer and pentamer (manufactured by Dow Corning Corp. under the tradenames Dow Corning ®344 and 345, respectively). The most preferred cyclic poly(dimethylsiloxane) is the tetramer.

The tin and zinc octoates have been described in the aforementioned U.S. Pat. No. 4,306,990, incorporated herein by reference, and will not be discussed in any further detail herein.

The petroleum distillates, also called naphthas, useful in accordance with the invention include the aliphatic and aromatic hydrocarbons derived from petroleum, their synthetic counterparts, and mixtures thereof.

The specific aliphatic hydrocarbons which may be used in the practice of the invention will be selected by the user in accordance with his specific application taking all of the properties of the solvent and the results desired into consideration. Preferred aliphatic hydrocarbons are the normal pentanes, hexanes, heptanes, and mixtures thereof, such as the petroleum ethers or ligroins.

The aromatic hydrocarbons are preferred in compositions of the invention which are to be applied by electrostatic spraying. A preferred aromatic hydrocarbon is xylene.

It is, of course, to be recognized that the hydrocarbons, while less harmful to the substrates than the chlorohydrocarbons, still do suffer from the disadvantages of attack on the substrates and flammability. However, in some applications, those disadvantages will be relatively less than the above enumerated disadvantages of the chlorohydrocarbons of the disadvantages of the siloxane solvents, such as cost. Thus, for any specific application the user will select the proper solvents or mixtures thereof in accordance with his knowledge as one skilled in the art.

In accordance with the modification of this invention, the admixture of zinc octoate and tin octoate may be replaced in whole or in part by other catalysts, known in the art, such as dibutyl tin oxide, dialkyl tin dicarboxylates wherein the alkyl residue, which may be branched or unbranched, contains 1–10 carbon atoms, preferably, four carbon atoms, and the carboxylic residues which may contain 2 to 20 and, preferably, 2 to 12 carbon atoms. The alkyl tin dicarboxylates useful in the practice of the invention include dibutyl tin di(2-ethylhexoate), dibutyl tin diacetate and dibutyl tin di(dodecanoate).

In accordance with another embodiment of the invention, there is provided an improved method for cleaning and protecting substrates selected from the group consisting of wood, fiberglass, fabric floor coverings, wall coverings, textiles, glass, suede, leather, tile, plastics, ceramics, paint, masonry and metals by contacting said substrate for a sufficient time and at an appropriate temperature with a composition comprising a solution of an admixture of poly(methylhydrosiloxane), tin octoate and zinc octoate in 1,1,1-trichloroethane wherein the improvement comprises replacing part or all of the trichloroethane by at least one solvent selected from the group consisting of cyclic poly(dimethylsiloxane)s, petroleum distillates and methylene chloride.

The methods of contacting the surface are known in the art and include swabbing the surfaces with swabs moistened or wet with any of the improved compositions of the invention, spraying the composition on the surface followed by draining or wiping off of any excess cleaning composition. The following examples illustrate the invention, but are not meant to limit the scope thereof which is defined by the claims.

EXAMPLE I

In order to show the improvement of the solvent according to the instant invention over the 1,1,1-trichloroethane of the U.S. Pat. No. 4,306,990, the compatibility of several substrates with the solvents of the instant invention was investigated.

Experiment 1, wherein the compatibility of phonograph record plastic, i.e., poly(vinylchloride), (hereafter 'PVC'), with the solvents was determined by placing small pieces of a record, approximately ¾" in diameter, in a beaker containing the solvent. After nine minutes, the pieces were removed and inspected. The results are listed in Table 1.

In experiment 2, the compatibility of polystyrene (hereafter 'PS'), with the solvents of the invention, was determined by filling thin film PS bottle caps having PS foam liners with the solvent. The results are given in Table 1.

For the determination of the compatibility of the solvents of the invention with Oil Base and Latex Base paints Experiment 3 was carried out as follows:

A section of plywood was painted with three types of paint (high gloss green linseed soya alkyd resin base paint, gray satin finish alkyd enamel paint, and a beige flat finish vinyl acrylic latex paint) each on its own section of the board. The paint was allowed to cure for four days at room temperature.

Paper towels wetted with various solvents were rubbed on the painted surfaces. The results are given in Table 1.

TABLE 1

| Experiment# | Substrate | Solvent[1,2] Dow TM 344 | Pet. Dist. | TCE | Xylenes | MC |
|---|---|---|---|---|---|---|
| 1 | PVC | N | N | Surface lost gloss. Slight | Softened. Signifi- | Swelling. Surface |

TABLE 1-continued

| Experiment# | Substrate | Dow ™ 344 | Solvent[1,2] Pet. Dist. | TCE | Xylenes | MC |
|---|---|---|---|---|---|---|
| | | | | softening. | cant damage | dissolved. |
| 2 | PS-liner | N | N | Attacked | Attacked | Attacked |
| 3 | Film Surface Paints[3] | N | N | Softened | Softened | Softened |
| | A | N | N | Gloss retained, paint on towel | Gloss retained, paint on towel | All surfaces removed. |
| | B | N | N | Gloss removed, paint on towel | Paint on towel* | All surfaces removed. |
| | C | N | N | Paint removed | Paint removed | All surfaces removed. |

Notes:
[1]Solvents Dow ™ 344 Tetrameric poly(dimethylsiloxane) (manufactured by Dow Corning Corp.)
Petroleum dist = petroleum distillate (Shell Sol #71, an aliphatic petroleum distillate with 3% unsaturation (sold by Shell Chemical Corp.)
TCE 1.1.1-Trichloroethane
Xylenes Commercial grade mixture of isomers
MC methylene chloride
[2]Solvent Effect
N = no effect by solvent on substrate
[3]Paints
A high gloss green linseed soya alkyd resin base paint
B gray satin finish alkyd enamel paint
C beige flat finish vinyl acrylic latex paint
*Not completely removed from surface.

EXAMPLE 2

As the smearing on substrates is a function of the rate of evaporation of the solvent for the cleaning composition, (i.e. smearing decreases as the evaporation rate increases), the relative evaporation rates for the solvents was determined as follows:

One half milliter volumes of various solvents were evaporated from watch glasses located in an exhaust hood. The time required to evaporate the solvent was recorded and normalized as a multiple of time relative to the evaporation rate of 1,1,1-trichloroethane. The following solvents were tested yielding the given results.

| Solvent | Actual Evaporation Time | Evaporation Time Relative to 1,1,1-Trichloroethane |
|---|---|---|
| Methylene Chloride | 4.9 min | 0.53 |
| 1.1.1-Trichloroethane | 9.3 min | 1.0 |
| Xylenes | 70.0 min | 7.5 |
| Petroleum distillates (Shell Sol #71) | 270.0 min | 29.0 |
| Polydimethyl cyclosiloxane (Dow 344 Fluid) | 315.0 min | 34.0 |
| Water | 340.0 min | 36.0 |

EXAMPLE 3

A cleaning and protecting solution, prepared according to the invention, comprising the admixture of:

| | parts by weight |
|---|---|
| poly(methylhydrosiloxane) | 6 |
| zinc octoate | 0.03 |
| and tin octoate | 0.03 | in 94 parts of xylene was electrostatically sprayed on a metal surface. The protective coating obtained was found to be smooth and even.

COMPARATIVE EXPERIMENT

When the xylene of the above composition was replaced by 1,1,1-trichloroethane, to produce the cleaning and protecting solution according to U.S. Pat. No. 4,306,990, the coating on the metal surface was found to be thick, greasy and smeared.

What is claimed is:

1. An improved cleaning and protecting composition consisting of an admixture of poly(methylhydrosiloxane), tin octoate and zinc octoate in at least one solvent selected from the group consisting of cyclic poly(dimethylsiloxane)s, poly(dimethylsiloxane) oils, petroleum distillates and methylene chloride and wherein the tin octoate and zinc octoate are present in a weight ratio of 1:1.

2. The composition according to claim 1 wherein the poly(methylhydrosiloxane) has the general structure

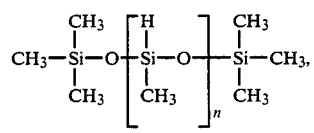

wherein n is an integer between about 20 and about 1,000.

3. The composition according to claim 1 wherein said cyclic poly(dimethylsiloxane) is selected from the group consisting of cyclic tetramer and cyclic pentamer.

4. The composition according to claim 1 wherein said cyclic poly(dimethylsiloxane) is the tetramer.

5. An improved method for cleaning and protecting substrates selected from the group consisting of wood, fiberglass, fabric floor coverings, wall coverings, textiles, glass, suede, leather, tile, plastics, ceramics, paint masonry and metals by contacting said substrate for a sufficient time and at an appropriate temperature with the composition of claim 1.

6. The method according to claim 5 wherein said substrate is selected from the group consisting of fabric floor coverings, wall coverings, textiles, glass and leather and tile.

7. The method of claim 5 wherein said substrate is a surface comprising poly(vinylchloride).

8. The method of claim 5 wherein said substrate is a painted surface comprising a paint selected from the group consisting of linseed soya alkyd resin base paint, vinly acrylic latex paint and alkyd enamel paints.

9. The method of claim 5 wherein said substrate comprises polystyrene.

10. The method of claim 5 wherein said substrate comprises a metal.

11. The method according to claim 5 wherein said substrate is selected from the group consisting of fabric floor coverings, wall coverings, textiles, glass and leather and tile.

12. The composition of claim 1, wherein the tin octoate and zinc octoate are present in a combined weight of 1.0% of the poly(methylhydrosiloxane).

13. The composition of claim 5, wherein the tin octoate and zinc octoate are present in a combined weight of 1.0% of the poly(methylhydrosiloxane).

* * * * *